United States Patent
Slepov (10) Patent No.: US 8,432,278 B2
(45) Date of Patent: Apr. 30, 2013

(54) NETWORK-ENABLED DEVICE WITH IMPROVED STATUS INDICATION OF SAID DEVICE'S NETWORK STATE AND DEVICE STATE USING A SINGLE LIGHT INDICATOR OR A SET THEREOF

(75) Inventor: Dmitry Slepov, Taipei Hsien (TW)

(73) Assignee: Tibbo Technology, Inc., Taipei Hsien (TW)

( * ) Notice: Subject to any disclaimer, the term of this patent is extended or adjusted under 35 U.S.C. 154(b) by 486 days.

(21) Appl. No.: 12/769,002

(22) Filed: Apr. 28, 2010

(65) Prior Publication Data
US 2011/0267191 A1    Nov. 3, 2011

(51) Int. Cl.
*G08B 21/00*    (2006.01)
(52) U.S. Cl.
USPC ................................. 340/540; 340/815.45
(58) Field of Classification Search .................. 340/540, 340/815.45, 815.4, 525; 362/800; 709/224; 710/18, 19
See application file for complete search history.

(56) References Cited

U.S. PATENT DOCUMENTS

| | | | |
|---|---|---|---|
| 6,693,550 B1 * | 2/2004 | Heiler et al. | 340/815.45 |
| 6,724,889 B1 * | 4/2004 | Giles et al. | 379/377 |
| 7,505,792 B2 * | 3/2009 | Kim et al. | 455/566 |
| 7,663,501 B2 * | 2/2010 | Hyun et al. | 340/525 |
| 7,889,094 B2 * | 2/2011 | Gilbert et al. | 340/815.45 |

* cited by examiner

*Primary Examiner* — John A Tweel, Jr.
(74) *Attorney, Agent, or Firm* — Morris Manning & Martin LLP; Tim Tingkang Xia, Esq.

(57) ABSTRACT

A network-enabled device is provided. The provided network-enabled device includes at least one light indicator, and an electronic circuit capable of controlling brightness of said light indicator and driving said light indicator in a manner that allows simultaneous indication of at least a first dimension and a second dimension of said network-enabled device's operational state on said at least one light indicator using at least a first method and a second method of status indication. The present invention reduces the size, cost, and complexity—both internal and aesthetic—of network-enabled devices by combining the functions of the network LED (or a set thereof) and the device LED (or a set thereof) in a single status LED (or a set thereof).

16 Claims, 9 Drawing Sheets

NETWORK-ENABLED DEVICE WITH IMPROVED STATUS INDICATION OF SAID DEVICE'S NETWORK STATE AND DEVICE STATE USING A SINGLE LIGHT INDICATOR OR A SET THEREOF

BACKGROUND OF THE INVENTION

1. Field of the Invention

This invention relates generally to network-enabled devices, i.e. devices with a network interface. Examples of network interfaces are Ethernet and Wi-Fi interfaces.

More particularly, this invention relates to an improved network-enabled device using an innovative method of simultaneous indication of at least two dimensions of device's operational state on a single light indicator, such as a light-emitting diode (LED), or a single set of light indicators; and using at least two different methods of said indication of device's operational state.

2. Description of the Related Art

Many modern electronic devices include a network interface provided by the network controller of the device. The network interface connects said electronic devices to data networks. Such electronic devices may comprise finished devices, as well as network modules that can be used as building blocks for finished devices.

In the majority of cases, the network interface of a given electronic device is an Ethernet interface. In recent years, several wireless interfaces, such as Wi-Fi and ZigBee, have gained traction as well. An overwhelming majority of data networks are of TCP/IP type, but other types of networks also exist.

For the purpose of clarity, an electronic device incorporating a network interface will hereinafter be referred to as a network-enabled device. A network-enabled device with the Ethernet interface will hereinafter be referred to as an Ethernet device, while the same with the wireless interface will be referred to as a wireless device. A network module with the Ethernet interface will be referred to as an Ethernet module, while the same with the wireless interface will be referred to as a wireless module.

It is understood that a network-enabled device can simultaneously be the Ethernet and the wireless device. Similarly, a network module can simultaneously be the Ethernet and the wireless module.

The operation of the network interface within the network-enabled device is typically characterized by a number of operating parameters that may be of interest to the user. These parameters jointly form a network state.

For example, the user may want to know if a link is established with another device on the network (typically, a network hub), and, if established, what type of link that is—a 10 Mb/s, 100 Mb/s, or 1000 Mb/s link, a half-duplex or full-duplex link, and so on.

Many network-enabled devices characteristically use a set of light indicators to convey the current network state. Such light indicators are typically implemented as light-emitting diodes (LEDs). Said light indicators will hereinafter be referred to as network LEDs with the understanding that the function of these LEDs is to indicate the current network state of the network-enabled device, and that the use of the term "network LED" shall not be taken in a manner limiting the implementation of light indicators only as LEDs.

Ethernet devices typically employ two network LEDs—one of green color, and one of yellow color.

The green network LED is conventionally employed to indicate the state of the Ethernet link. The LED is off (dark) when the link is not established, and on (emits light) when the link is established.

The yellow network LED is conventionally employed to indicate the mode of the established Ethernet link. The LED is off when the link is established at 10 Mb/s. The LED is on when the link is established at 100 Mb/s.

It is noteworthy that although most Ethernet devices default to the above status indication arrangement, there is a number of variations on the subject. For example, only the "link" LED could be present, and the "mode" LED left out of the Ethernet device. Alternatively, a third LED could exist and indicate a half-duplex or full-duplex nature of the link. These variations are immaterial to the scope and spirit of the present invention.

In a similar manner, the wireless interface may be idle or associated with a wireless access point. When associated, the state of the wireless interface may be characterized by the link speed, employed security protocol, current signal strength, and so on. A dedicated network LED or a set of network LEDs may be employed to convey these states to the user.

Regardless of the network interface type used on a particular network-enabled device, a plurality of current network operating parameters will be understood to form a first dimension of this device's operational state.

On wireless devices, there is no particularly popular method of integrating network LEDs into the device. On Ethernet devices, network LEDs may be separate from an RJ connector jack, or, as is often the case, be combined with the latter.

It shall be noted, that in the known network-enabled devices, network LEDs are controlled in a digital (binary) manner, meaning that a particular network LED can either be on, or off, with no meaningful information conveyed specifically through the brightness of this LED.

RJ connectors are commonly used in telecommunications, data networking equipment, and devices having an ability to connect to data networks. RJ connectors employ a male connector plug and a female connector jack.

For finished devices, the latter is typically mounted on the circuit board of the device and exposed in such a way as to allow the insertion of the male connector plug. For network modules, the jack and the network module are electrically connected with each other, commonly through the circuit board. Some connector jacks, such as the subject of U.S. Pat. No. 6,881,096, incorporate a network module into the connector jack itself.

Figure 1:
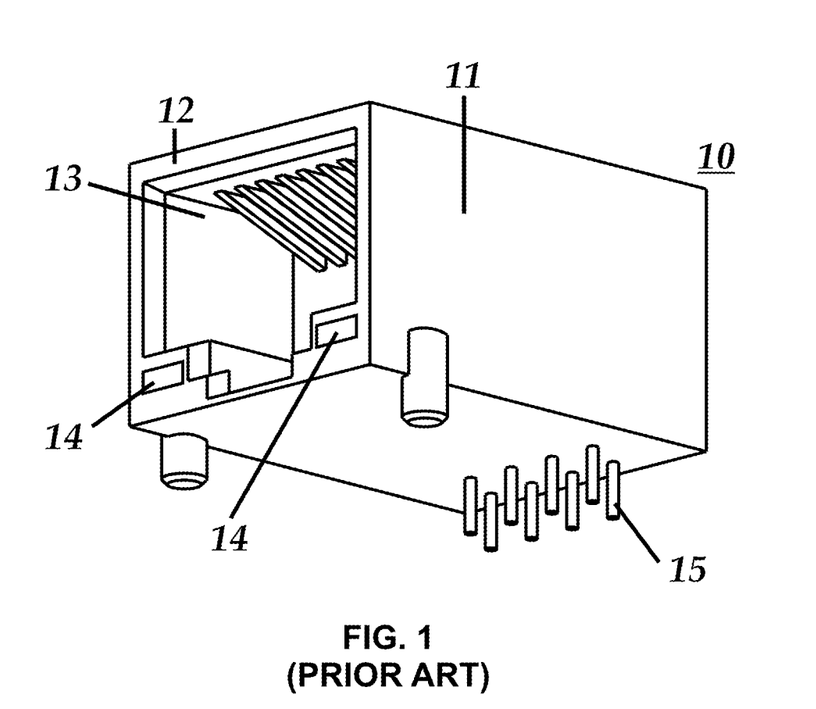
FIG. 1 shows a construction of a typical connector jack according to the prior art.

A simplified drawing of a typical connector jack according to the prior art is shown on FIG. 1.

The conventional connector jack 10 characteristically comprises a generally rectangular housing 11, said housing 11 having a front face 12 with a receptacle 13 for receiving a male connector plug (not shown).

The front face 12 often includes or exposes a pair of LEDs 14. Of the two LEDs 14, one is typically of green color, and the other one is typically of yellow color. A wide variety of other color combinations is also available. Additionally, some connector jacks incorporate multi-color LEDs.

The mounting methods of LEDs 14 within the connector jack vary widely from design to design. Said LEDs may be mounted behind the front face 12, inside the connector jack 10 and connected to the front face 12 by light guides, or may be incorporated into the connector jack 10 in a multitude of other ways.

Some connector jack designs, such as the subject of the U.S. patent application Ser. No. 12/144,914, anticipate the placement of LEDs 14 on the circuit board and under the connector jack.

The connector jack also incorporates pins or leads 15. These pins or leads 15 conduct electrical signals between the jack 10 and the circuit board (not shown). In cases where the connector jack 10 directly incorporates LEDs 14, some of the pins or leads 15 are electrically connected to said LEDs and allow the control of the same.

The network-enabled device typically has its own overall operating parameters of interest to the user. These parameters are generally independent from the operating parameters of the network interface and must be displayed separately. Such operating parameters jointly form a device state.

Regardless of the particular set of operating parameters exhibited by the network-enabled device, a plurality of device operating parameters will be understood to form a second dimension of this device's operational state.

On larger and (or) more expensive network-enabled devices, there may be an LCD panel (display), which can be utilized to display the device state. Smaller and (or) less expensive network-enabled devices often employ a dedicated LED or a set of LEDs. Such LEDs will hereinafter be referred to as device LEDs.

The term "device LED" is herein used to differentiate said device LEDs from the network LEDs. It is understood that the term "device LED" implies "device status LED" or "device light indicator", and denotes an LED (lamp, or a light indicator of other type) that expresses either the overall state of the network-enabled device, or the state which is sufficiently different from or unrelated to the network state.

For example, in addition to two network LEDs, a DS100 serial-to-Ethernet converter manufactured by Tibbo Technology™ has two device LEDs: one green ("G") and one red ("R"). A multitude of device states is expressed by generating various flashing (blinking) patterns.

For instance, an idle mode of the DS100 is indicated by two rapid flashes of the green device LED followed by a 2-second gap. This can be expressed as the following pattern:

G-G-----G-G----- . . . .

Running in the setup (configuration) mode is indicated by an alternate flashing of green and red device LEDs:

GRGRGRGR . . . .

Overall, there are more than ten different patterns and practice shows that one LED pair comprising LEDs of two different colors is very effective in conveying different device states. For simple devices, a single device LED will often suffice.

In the known network-enabled devices, network LEDs are typically controlled by the network controller of the network-enabled device, while the device LEDs are typically controlled by the CPU or microcontroller of the network-enabled device.

Figure 2:
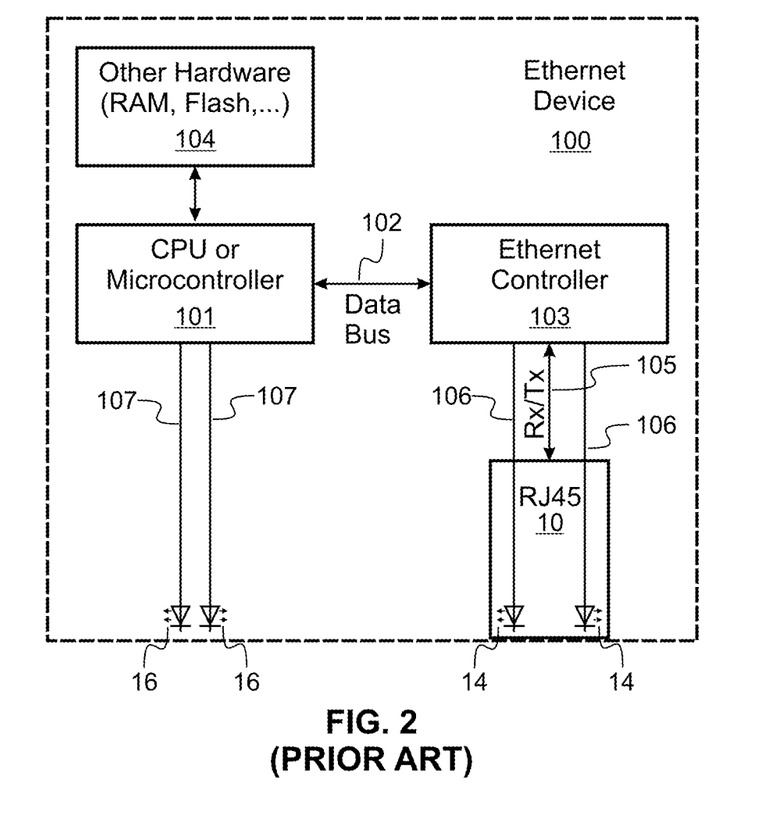
FIG. 2 is a block diagram of a typical Ethernet device according to the prior art.

Referring particularly to FIG. 2, there shown a simplified block diagram of a typical Ethernet device according to the prior art.

An Ethernet device 100 incorporates a CPU or microcontroller 101. The latter is connected, through a data bus 102, to an Ethernet controller 103, which implements the network interface of said Ethernet device 100. In many Ethernet devices, the CPU or microcontroller 101 is also connected to other hardware 104. Said other hardware 104 may include RAM, flash memory, and other necessary components. These are immaterial to the scope and spirit of the present invention.

It is noteworthy, that some CPUs and microcontrollers on the market today incorporate Ethernet controllers, so blocks 101 and 103 may be realized as a single integrated circuit, with the data bus 102 existing within said integrated circuit.

The Ethernet controller 103 is coupled to a connector jack 10. Specifically, the Ethernet controller 103 and the connector jack 10 are linked by receive (Rx) and transmit (Tx) line pairs 105. In addition, there are network LED control lines 106 that drive internal LEDs 14 of the connector jack 10. Thus, LEDs 14 serve as network LEDs of the Ethernet device 100. Although only two single-color LEDs 14 are shown, it is understood that there could be more LEDs and (or) multicolor LEDs built into the connector jack 10. Such variations are immaterial to the scope and spirit of the present invention.

The Ethernet device 100 also incorporates two standalone LEDs 16. Said LEDs are controlled, through device LED control lines 107, by the CPU or microcontroller 101. LEDs 16 serve as device LEDs of the Ethernet device 100.

Figure 3:
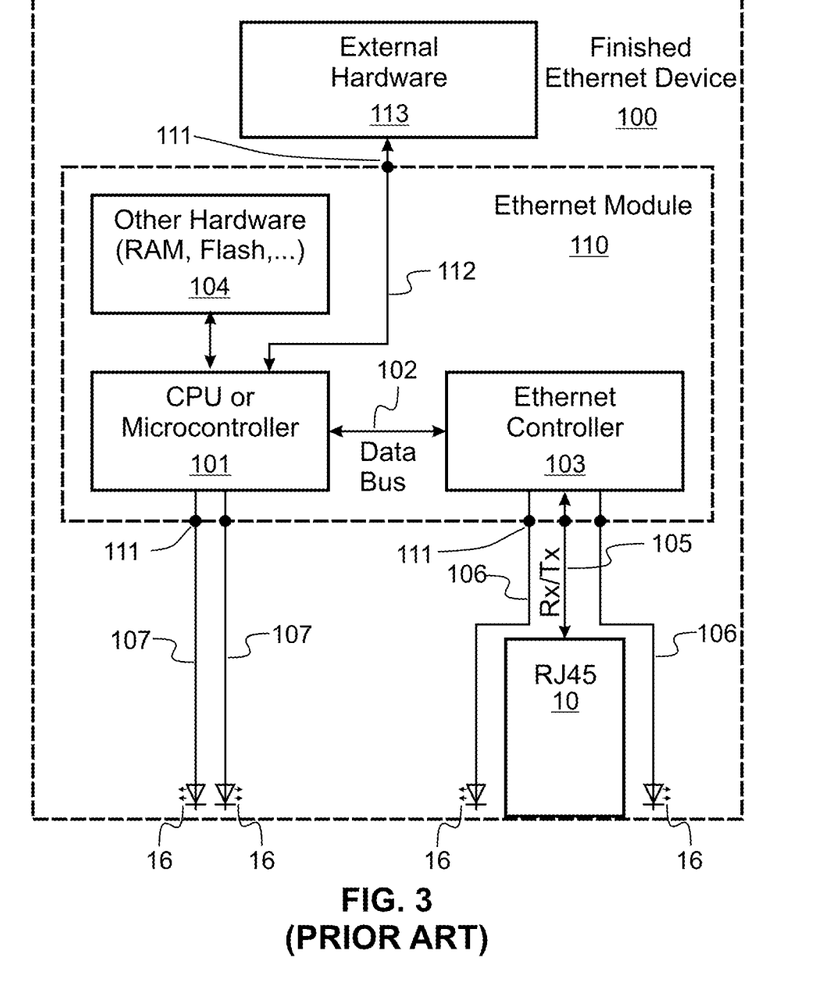
FIG. 3 is a block diagram of a typical finished Ethernet device based on an Ethernet module according to the prior art.

Referring particularly to FIG. 3, there shown a simplified block diagram of a typical Ethernet module according to the prior art and a finished Ethernet device based on said Ethernet module. FIG. 3 illustrates, in particular, that both the Ethernet module and the finished Ethernet device each constitute network-enabled devices.

The Ethernet module 110 is typically installed on the circuit board of the finished Ethernet device 100. Said Ethernet module 110 incorporates the CPU or microcontroller 101, the data bus 102, the Ethernet controller 103, and other hardware 104, which may include RAM, flash memory, and other necessary peripherals.

The Ethernet module 110 has a number of pins, leads, or interface lines 111 through which it is coupled to the connector jack 10, LEDs 16 (two controlled by network LED control lines 106, and two controlled by device LED control lines 107), as well as external (with respect to the Ethernet module 110) hardware 113.

For the purpose of illustrating a wide variety of ways in which the network LEDs can be incorporated into the Ethernet device 100, the diagram on FIG. 3 shows LEDs 16, which are separate from the connector jack 10 (and not LEDs 14 built into the connector jack 10). Such a design shall not be construed as a specific feature of finished Ethernet devices incorporating Ethernet modules. Rather, it is as an illustration of an alternative way of incorporating LEDs into a network-enabled device.

Physically, the Ethernet module 110 can be implemented, for instance, as a circuit board with pins or leads for mounting on the host circuit board of the finished Ethernet device 100. Details of the physical construction of the Ethernet module 110 are immaterial to the scope and spirit of the present invention.

Figure 4:
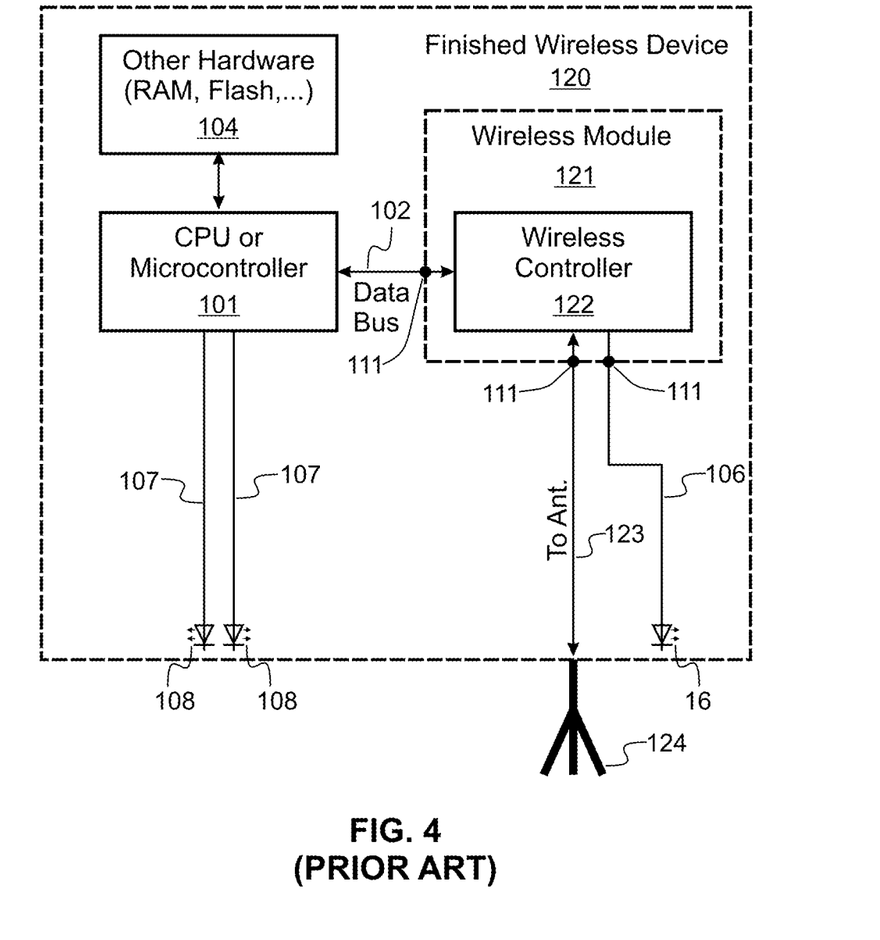
FIG. 4 is a block diagram of a typical finished wireless device based on a wireless module according to the prior art.

Referring particularly to FIG. 4, there shown a simplified block diagram of a typical finished wireless device based on a wireless module according to the prior art.

The wireless module 121 incorporates a wireless controller 122. The CPU or microcontroller 101, as well as the other hardware 104 are external with respect to the wireless module 121. The data bus 102 serves as an interface between the wireless module 121 and the CPU or microcontroller 101.

The wireless controller 122 drives, through a coaxial cable 123, an antenna 124. Additionally, the wireless module 121 controls one LED 16, which plays the role of the network LED. Having a single network LED shall not be construed as a specific feature of wireless devices. Rather, it is as an illustration of an alternative way of building network-enabled devices.

It will be obvious to those skilled in the art that the network-enabled devices discussed herein can be constructed and (or) modularized in a multitude of other ways and typical diagrams presented on FIG. 2-4 do not describe the entire range of architectures available to said network-enabled devices. Many other architectures fall within the spirit and the scope of the present invention.

Continuous miniaturization of electronics has led to a dramatic reduction in the outline dimensions of many products, network-enabled devices included. At the same time, development of highly integrated and low-cost network controllers and modules has brought about an era of ubiquitous networking, where scores of simple and inexpensive products incorporate a network interface and communicate with the outside world.

In this new era of simple and miniature network-enabled devices, the space is limited and every extra component counts. The fewer components a given network-enabled device contains, the better.

Reduced dimensions of some network-enabled devices have also led to the shrinkage of the available space on the face (faceplate, connector plate) of said devices. Connector jacks of Ethernet devices now often occupy a very significant portion of available faceplate real estate. This may be true to the point where it becomes difficult to find a place anywhere on the product's surface for even a simple pair of LEDs.

Additionally, there is a general minimalist design trend spreading throughout the industry, which calls for the maximum simplification of the product's look, as well as the reduction of the number of buttons, indicators, and other design elements exposed to the user.

SUMMARY OF THE INVENTION

In view of the above, it is an object of the present invention to reduce the size, cost, and complexity—both internal and aesthetic—of network-enabled devices by combining the functions of the network LED (or a set thereof) and the device LED (or a set thereof) in a single status LED (or a set thereof).

According to the object of the present invention, a network-enabled device is provided, The provided network-enabled device includes at least one light indicator, and an electronic circuit capable of controlling brightness of said light indicator and driving said light indicator in a manner that allows simultaneous indication of at least a first and a second dimensions of said network-enabled device's operational state on said at least one light indicator using at least a first and a second methods of status indication.

In the preferred embodiment of the present invention, the Ethernet controller does not control the network LEDs. Instead, the CPU or microcontroller of the Ethernet device controls a status LED (or a set thereof) in a manner that allows simultaneous indication of at least two dimensions of device's operational state on said status LED (or set thereof) and using at least two different methods of such status indication.

According to the preferred embodiment of the present invention, the CPU or microcontroller of the Ethernet device uses pulse-width modulated (PWM) output lines to control said status LEDs. Therefore, the CPU or microcontroller has an ability to not only turn the status LEDs on or off, but also to set individual brightness of each status LED to a predefined level and thus convey additional meaningful information.

It is contemplated that the CPU or microcontroller will use said status LEDs to indicate the device state through various blinking patterns, thus providing a first, pattern-based, method of status indication.

It is further contemplated that the CPU or microcontroller will query internal registers of the Ethernet controller to obtain the current network state. Said CPU or microcontroller will then set the maximum brightness of said status LEDs according to the obtained network state, thus providing a second, brightness-based, method of status indication. The user of the Ethernet device will then be able to observe device state patterns displayed at various brightness levels indicative of the network state.

In the alternative embodiment of the present invention, the CPU or microcontroller does not control the status LEDs through PWM output lines. In the alternative embodiment of the present invention the CPU or microcontroller controls the brightness of the status LEDs using digital-to-analog output lines.

In the third embodiment of the present invention, the CPU of microcontroller does not query the network state by reading the internal registers of the wireless controller. In the third embodiment of the present invention, the network LED control lines of the wireless controller are connected to the CPU or microcontroller, and the latter can infer the current network state by polling the state of said network LED control lines, thus eliminating the need for reading the internal registers of the wireless controller.

Other objects, features and advantages of the present invention will be apparent from the following detailed description taken in connection with the accompanying drawings.

BRIEF DESCRIPTION OF THE DRAWINGS

The above objects and advantages of the present invention will become more readily apparent to those ordinarily skilled in the art after reviewing the following detailed descriptions and accompanying drawings, in which.

DETAILED DESCRIPTION OF THE PREFERRED EMBODIMENT

With reference to the following disclosures combined with the accompanying drawings While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims and their equivalents.

Referring to FIG. 5-9, embodiments of the present invention are shown.

Figure 5:
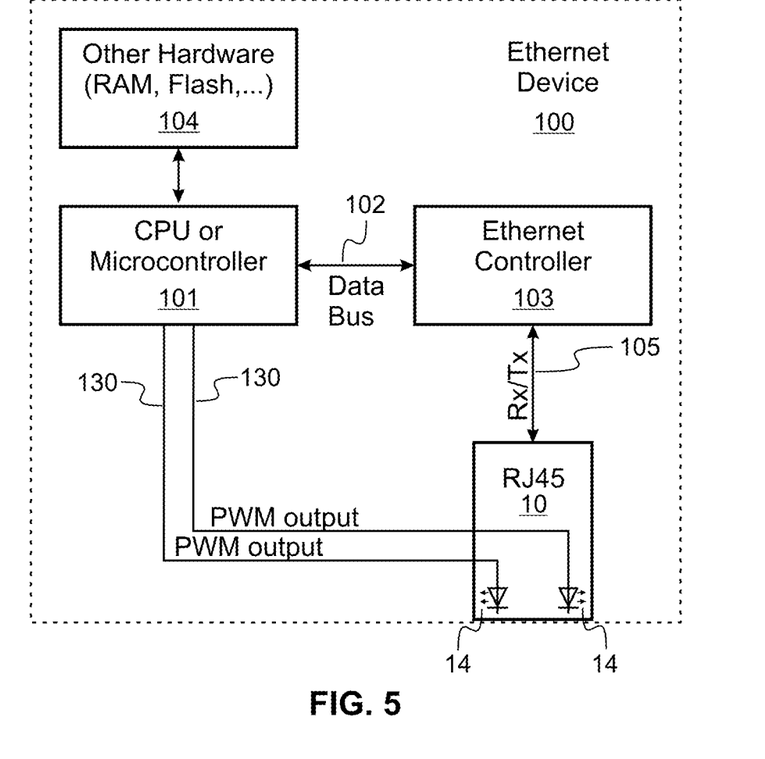
FIG. 5 is a block diagram of the Ethernet device according to the preferred embodiment of the present invention.

Referring particularly to FIG. 5, there shown a block diagram of the Ethernet device according to the preferred embodiment of the present invention.

According to the preferred embodiment of the present invention, the Ethernet controller 103 does not drive the LEDs 14. Instead, the CPU or microcontroller 101 controls said LEDs 14 through pulse-width modulated (PWM) lines 130. Said LEDs 14 serve as status LEDs of the network-enabled device 100. That is, they simultaneously play the roles of network LEDs and device LEDs.

With pulse-width modulation, the brightness of LEDs can be controlled by varying the duty cycle of the generated square wave signal. It is contemplated that the CPU or microcontroller 101 will set maximum brightness of LEDs 14 according to the current network state.

The data bus 102 connecting the CPU or microcontroller 101 to the Ethernet controller 103 is used for data exchange between the two. Additionally, the CPU or microcontroller 101 uses the data bus 102 to access the internal registers of the Ethernet controller 103. Typical Ethernet controllers have dozens of internal registers used for defining precise operating parameters of the Ethernet interface, as well as for reading out the current state of the same. Among these registers are typically registers that convey information about the current network state.

Conventionally, one of the registers of the Ethernet controller 103 will have a link status bit that is set when a proper link is established between the Ethernet device and another device, such as a network hub. The bit is cleared when the link is "broken".

In addition, there is typically a group of bits conveying other information pertaining to the mode of the established link: the bit rate at which the link is established (10 Mb/s, 100 Mb/s, or even 1000 Mb/s), full-duplex or half-duplex mode of link operation, and so on.

The CPU or microcontroller 101 can periodically read (poll) the state of the above bits by accessing related registers of the Ethernet controller 103. The CPU or microcontroller 101 can then control the duty cycles on PWM lines 130 in accordance with the current network state.

Figure 6:
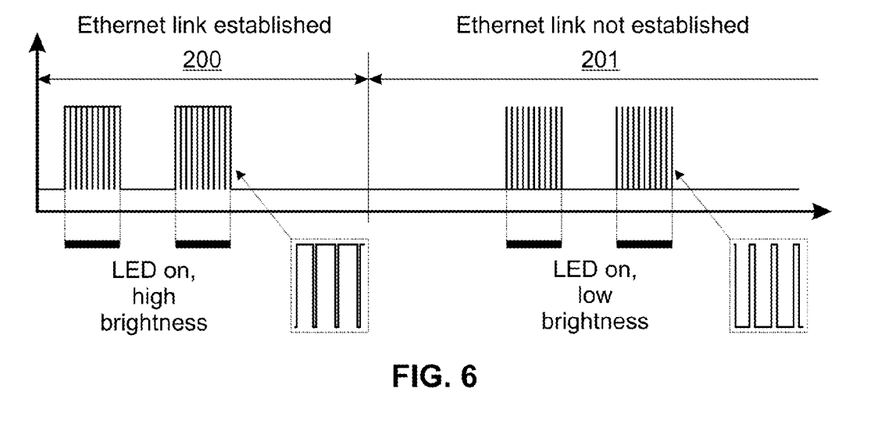
FIG. 6 is a sample waveform diagram of the pulse-width modulated signal on the status LED control line according to the preferred embodiment of the present invention.

Looking now at FIG. 6, there shown a waveform diagram of the pulse-width modulated signal on one of the PWM lines 130.

For the purpose of illustrating the operation of PWM lines 130, it will be assumed that the waveform is for the PWM control line of the green status LED. The waveform presented on FIG. 6 shows a "G-G-----G-G-----" pattern already discussed earlier. The waveform example also assumes that the LED is on (emits light) when the PWM line 130 is in high logical state (positive control polarity, i.e. the higher the average voltage on the PWM line is, the brighter the LED is).

Presented on the diagram are two consecutive cycles—200 and 201—of the pattern. The brightness of said pattern display is made to depend on the current link status of the Ethernet controller. The first cycle 200 is shown to be generated while the Ethernet controller is in the linked state; the second cycle 201 is shown to be generated while the Ethernet controller is not in the linked state.

Looking at FIG. 6, those skilled in the art will immediately recognize pulse-width modulated waveform and the difference between the first and the second cycles of the pattern generation.

When the Ethernet link is established (cycle 200) and at the moments of pattern generation when the LED needs to be on, the duty cycle of the PWM output is set to 100% or close to 100%. This causes the LED to flash at a maximum, or close to maximum, brightness.

When the Ethernet link is not established (cycle 201) and at the moments of pattern generation when the LED needs to be on, the duty cycle of the PWM output is set to a fraction of the maximum, for example, 30%. As a result, the user will see the same pattern consisting of two LED flashes followed by a gap, but the flashes of the LED will not be as bright as during the first cycle 200.

It must be noted that the particular device state pattern ("G-G-----G-G-----"), as well as the relationship between the maximum LED brightness and a particular aspect of the network state—the status of the link—are used herein only for illustrative purposes. Those skilled in the art will immediately recognize that other patterns can be generated, the brightness of the LED can be tied to some other aspect of the network state, the way in which the brightness of the LED is selected to relate to a certain aspect of the network state may be different, and that the color and control polarity of the LED can be changed without departing from the scope and spirit of the present invention.

Figure 7:
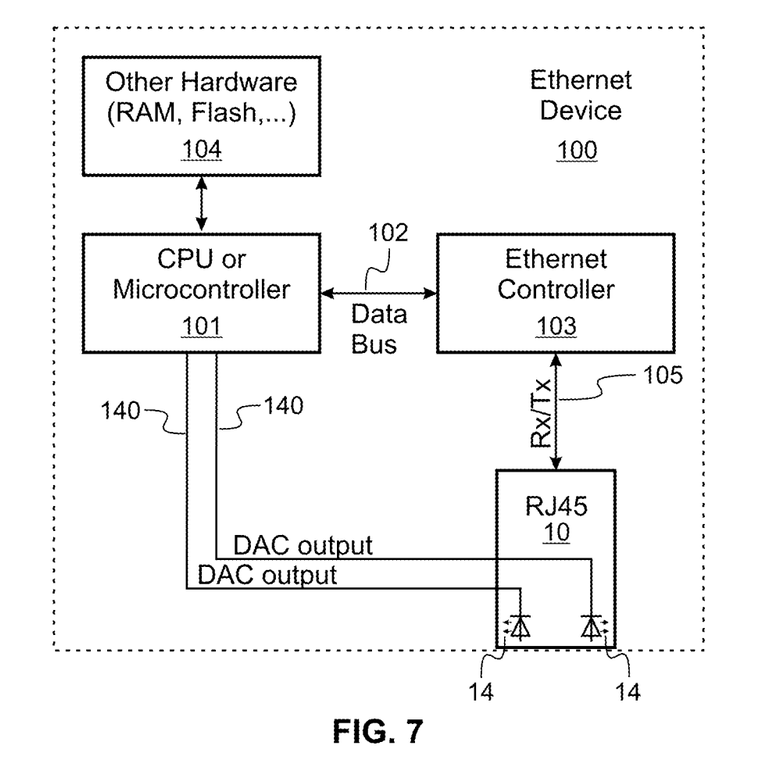
FIG. 7 is a block diagram of the Ethernet device according to the alternative embodiment of the present invention.

Referring particularly to FIG. 7, there shown a block diagram of the Ethernet device according to the alternative embodiment of the present invention.

In the alternative embodiment of the present invention, the CPU or microcontroller 101 does not control the LEDs 14 using PWM output lines. In the alternative embodiment of the present invention, the CPU or microcontroller uses digital-to-analog (D/A) output lines 140 to control individual brightness of each LED 14.

Figure 8:
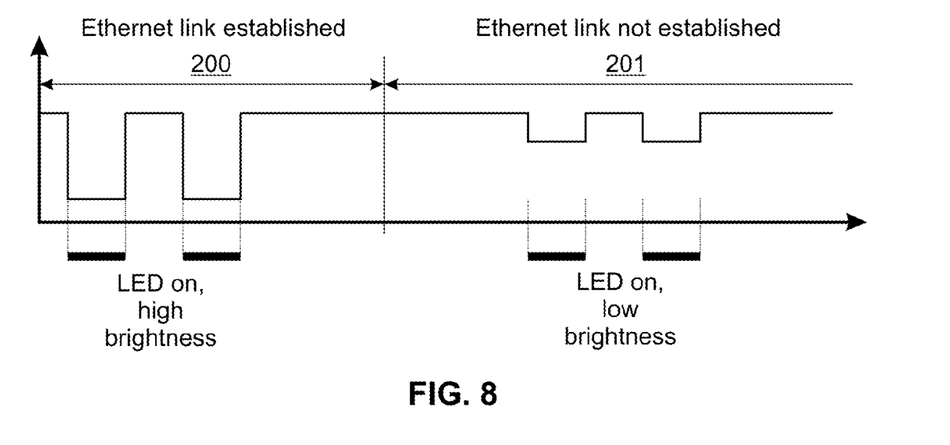
FIG. 8 is a sample waveform diagram of the analog signal on the status LED control line according to the alternative embodiment of the present invention.

Looking now at FIG. 8, there shown a waveform diagram of the analog signal on one of the D/A output lines 140. For the purpose of illustrating a wide variety of methods in which the present invention can be practiced, it is assumed that the LED circuit has a negative control polarity (the lower the voltage of the D/A line, the brighter the LED is).

Those skilled in the art will immediately understand that the brightness of the LED during the second cycle of pattern generation will be lower than during the first cycle of pattern generation.

Figure 9:
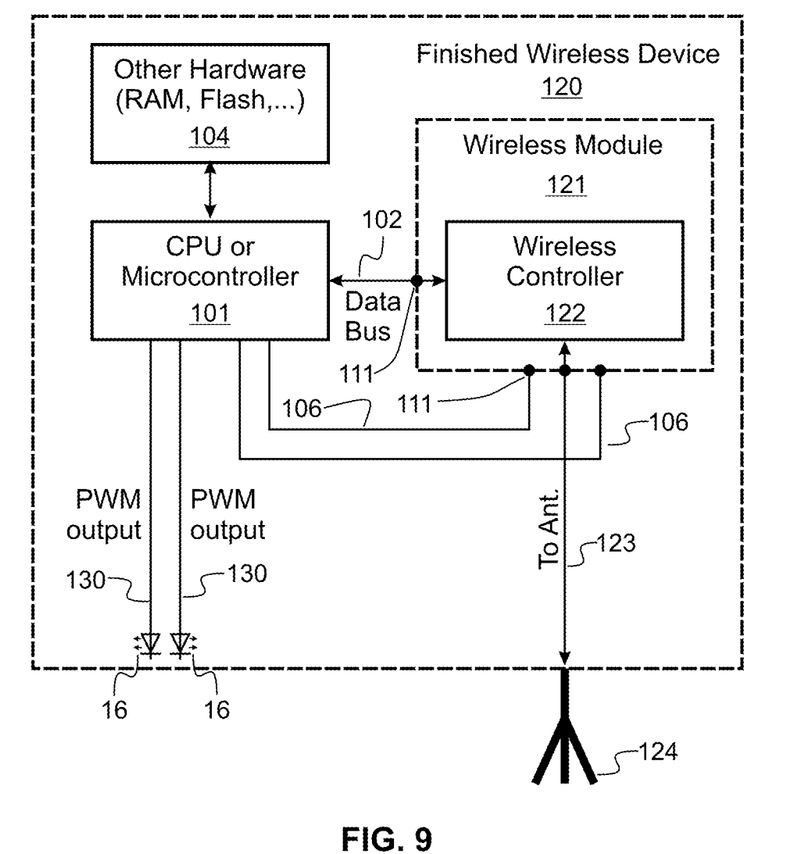
FIG. 9 is a block diagram of the finished wireless device according to the third embodiment of the present invention.

Referring particularly to FIG. 9, there shown a block diagram of the finished wireless device according to the third embodiment of the present invention.

In the third embodiment of the present invention, the CPU of microcontroller 101 does not query the network state by reading the internal registers of the wireless controller 122. In the third embodiment of the present invention, the network LED control lines 106 of the wireless controller 122 are connected to the CPU or microcontroller 101, and the latter can infer the current network state by polling the state of said network LED control lines 106, thus eliminating the need for reading the internal registers of the wireless controller 122.

The manner in which the third embodiment of the present invention operates is particularly important for wireless devices because many wireless modules constitute far more closed systems than their Ethernet counterparts. For a variety of reasons, the option to query the network state through the data bus 102 may not be available, in which case the only solution is to directly sense the state of the network LED control lines 106.

While the invention has been described in terms of what is presently considered to be the most practical and preferred embodiment, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A network-enabled device comprising: at least one light indicator, and an electronic circuit capable of controlling brightness of said light indicator and driving said light indicator in a manner that allows simultaneous indication of at least a first dimension and a second dimension of said network-enabled device's operational state on said at least one light indicator using at least a first method and a second method of status indication.

2. The network-enabled device according to claim 1, wherein said first method of status indication comprises generating a set of flashing patterns on said at least one light indicator, and said second method of status indication comprises limiting the maximum brightness of said at least one light indicator.

3. The network-enabled device according to claim 2, wherein said first dimension of said network-enabled device's operational state comprises information pertaining to the device operating parameters of said network-enabled device, and said second dimension of said network-enabled device's operational state comprises information pertaining to network operating parameters of said network-enabled device.

4. The network-enabled device according to claim 3, wherein said network-enabled device comprises at least two said light indicators.

5. The network-enabled device according to claim 3, wherein said network-enabled device is an Ethernet device or a wireless device.

6. The network-enabled device according to claim 5, wherein said Ethernet device comprises a connector jack, and wherein said at least one light indicator is a light-emitting diode (LED) built into said connector jack.

7. The network-enabled device according to claim 5, wherein said at least one light indicator is controlled using a pulse-width modulation (PWM) technique.

8. The network-enabled device according to claim 5, wherein said at least one light indicator is controlled using a digital-to-analog (DA) technique.

9. The network-enabled device according to claim 5, wherein said Ethernet device is an Ethernet module.

10. The network-enabled device according to claim 5, wherein said wireless device is a Wi-Fi device.

11. The network-enabled device according to claim 5, wherein said wireless device is a wireless module.

12. The network-enabled device according to claim 3, wherein said electronic circuit comprises a central processing unit (CPU) or a microcontroller coupled to a network controller, and wherein said at least one light indicator is controlled by said CPU or said microcontroller.

13. The network-enabled device according to claim 12, wherein said CPU or said microcontroller is capable of obtaining network operating parameters of said network-enabled device by accessing said network controller through a data bus.

14. The network-enabled device according to claim 13, wherein said network controller is an Ethernet controller or a wireless controller.

15. The network-enabled device according to claim 12, wherein said CPU or said microcontroller is capable of obtaining network operating parameters of the network-enabled device by polling the state of network LED control lines of said network controller.

16. The network-enabled device according to claim 15, wherein said network controller is an Ethernet controller or a wireless controller.

* * * * *